United States Patent
Li et al.

(10) Patent No.: US 11,758,148 B2
(45) Date of Patent: *Sep. 12, 2023

(54) DEVICE-CONSISTENT TECHNIQUES FOR PREDICTING ABSOLUTE PERCEPTUAL VIDEO QUALITY

(71) Applicant: NETFLIX, INC., Los Gatos, CA (US)

(72) Inventors: Zhi Li, Mountain View, CA (US); Anne Aaron, Menlo Park, CA (US); Anush Moorthy, Redwood City, CA (US); Christos Bampis, Austin, TX (US)

(73) Assignee: NETFLIX, INC., Los Gatos, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/093,449

(22) Filed: Nov. 9, 2020

(65) Prior Publication Data

US 2021/0058625 A1 Feb. 25, 2021

Related U.S. Application Data

(63) Continuation of application No. 15/782,590, filed on Oct. 12, 2017, now Pat. No. 10,834,406.

(Continued)

(51) Int. Cl.
*H04N 19/154* (2014.01)
*H04N 19/59* (2014.01)
(Continued)

(52) U.S. Cl.
CPC ......... *H04N 19/154* (2014.11); *H04N 17/004* (2013.01); *H04N 19/00* (2013.01);
(Continued)

(58) Field of Classification Search
None
See application file for complete search history.

(56) References Cited

U.S. PATENT DOCUMENTS

| 6,075,884 A | 6/2000 | Lubin et al. |
| 8,718,145 B1 * | 5/2014 | Wang .............. H04N 19/12 375/240.07 |

(Continued)

FOREIGN PATENT DOCUMENTS

| CA | 2674916 A1 | 8/2008 |
| CN | 102714752 A | 10/2012 |

(Continued)

OTHER PUBLICATIONS

K. Gu, M. Liu, G. Zhai, X. Yang and W. Zhang, "Quality Assessment Considering Viewing Distance and Image Resolution," in IEEE Transactions on Broadcasting, vol. 61, No. 3, pp. 520-531, Sep. 2015, doi: 10.1109/TBC.2015.2459851. (Year: 2015).*

(Continued)

*Primary Examiner* — Stefan Gadomski
(74) *Attorney, Agent, or Firm* — Artegis Law Group, LLP

(57) ABSTRACT

In various embodiments, a perceptual quality application determines an absolute quality score for encoded video content viewed on a target viewing device. In operation, the perceptual quality application determines a baseline absolute quality score for the encoded video content viewed on a baseline viewing device. Subsequently, the perceptual quality application determines that a target value for a type of the target viewing device does not match a base value for the type of the baseline viewing device. The perceptual quality application computes an absolute quality score for the encoded video content viewed on the target viewing device based on the baseline absolute quality score and the target value. Because the absolute quality score is independent of the viewing device, the absolute quality score accurately reflects the perceived quality of a wide range of encoded video content when decoded and viewed on a viewing device.

27 Claims, 5 Drawing Sheets

Related U.S. Application Data

(60) Provisional application No. 62/432,870, filed on Dec. 12, 2016.

(51) Int. Cl.
    *H04N 21/647*      (2011.01)
    *H04N 19/146*      (2014.01)
    *H04N 21/234*      (2011.01)
    *H04N 21/2343*      (2011.01)
    *H04N 17/00*      (2006.01)
    *H04N 19/00*      (2014.01)
    *H04N 19/593*      (2014.01)

(52) U.S. Cl.
    CPC .......... *H04N 19/146* (2014.11); *H04N 19/59* (2014.11); *H04N 19/593* (2014.11); *H04N 21/23418* (2013.01); *H04N 21/23439* (2013.01); *H04N 21/647* (2013.01)

(56) References Cited

U.S. PATENT DOCUMENTS

| | | |
|---|---|---|
| 8,743,954 B1 | 6/2014 | Masterson |
| 8,897,370 B1 | 11/2014 | Wang et al. |
| 9,549,183 B2 | 1/2017 | Liao et al. |
| 9,712,860 B1 | 7/2017 | Waggoner et al. |
| 9,723,266 B1 | 8/2017 | Hu |
| 9,813,523 B2 | 11/2017 | Bar Bracha et al. |
| 10,085,015 B1 * | 9/2018 | Westwater ............ G06T 7/0002 |
| 10,091,507 B2 | 10/2018 | Lee et al. |
| 10,097,851 B2 | 10/2018 | Lee et al. |
| 10,182,097 B2 | 1/2019 | Bovik et al. |
| 2002/0090134 A1 | 7/2002 | Van Zon |
| 2003/0012426 A1 | 1/2003 | Ali |
| 2003/0095187 A1 | 5/2003 | Ferguson |
| 2004/0012675 A1 | 1/2004 | Caviedes |
| 2005/0286802 A1 | 12/2005 | Clark et al. |
| 2006/0222078 A1 | 10/2006 | Raveendran |
| 2007/0088516 A1 | 4/2007 | Wolf et al. |
| 2007/0257988 A1 | 11/2007 | Ong et al. |
| 2008/0137755 A1 | 6/2008 | Onur et al. |
| 2008/0143837 A1 | 6/2008 | Okamoto et al. |
| 2008/0260042 A1 | 10/2008 | Shah et al. |
| 2008/0284853 A1 | 11/2008 | Juric et al. |
| 2009/0007169 A1 | 1/2009 | Headley et al. |
| 2009/0141990 A1 | 6/2009 | Pigeon et al. |
| 2010/0061446 A1 | 3/2010 | Hands et al. |
| 2010/0074535 A1 | 3/2010 | Bennett |
| 2010/0278508 A1 | 11/2010 | Aggarwal |
| 2011/0243324 A1 | 10/2011 | Lima et al. |
| 2011/0299593 A1 * | 12/2011 | Pettersson ............ H04N 19/573 375/240.03 |
| 2012/0147958 A1 | 6/2012 | Ronca et al. |
| 2012/0155765 A1 | 6/2012 | Joshi et al. |
| 2012/0195376 A1 * | 8/2012 | Wu ...................... H04N 19/105 375/240.12 |
| 2012/0212624 A1 | 8/2012 | Yang et al. |
| 2012/0220877 A1 | 8/2012 | Takeshima |
| 2012/0269441 A1 | 10/2012 | Marchesotti et al. |
| 2012/0294511 A1 | 11/2012 | Datta et al. |
| 2013/0027568 A1 * | 1/2013 | Zou ...................... H04N 17/004 348/192 |
| 2013/0057705 A1 | 3/2013 | Parker et al. |
| 2013/0089154 A1 | 4/2013 | Chen et al. |
| 2013/0094565 A1 | 4/2013 | Yang et al. |
| 2013/0148525 A1 | 6/2013 | Sanchez et al. |
| 2013/0188060 A1 * | 7/2013 | Steinberg ............ H04N 17/004 348/182 |
| 2013/0194386 A1 | 8/2013 | Leontaris et al. |
| 2013/0293725 A1 | 11/2013 | Zhang et al. |
| 2013/0304934 A1 | 11/2013 | Joch et al. |
| 2013/0318253 A1 * | 11/2013 | Kordasiewicz ....... H04L 65/765 709/231 |
| 2013/0329781 A1 | 12/2013 | Su et al. |
| 2014/0119432 A1 | 5/2014 | Wang |
| 2014/0169662 A1 | 6/2014 | Liu et al. |
| 2014/0177734 A1 | 6/2014 | Carmel et al. |
| 2014/0201324 A1 | 7/2014 | Zhang et al. |
| 2014/0219088 A1 * | 8/2014 | Oyman ............ H04N 21/23439 370/231 |
| 2014/0241419 A1 | 8/2014 | Holmer |
| 2014/0286441 A1 | 9/2014 | Zhang et al. |
| 2014/0301486 A1 | 10/2014 | Liao et al. |
| 2014/0348246 A1 | 11/2014 | Fu et al. |
| 2015/0078670 A1 | 3/2015 | Reibman et al. |
| 2015/0117516 A1 | 4/2015 | Bracha et al. |
| 2015/0222905 A1 | 8/2015 | Zhang et al. |
| 2015/0245028 A1 * | 8/2015 | Choi .................... H04N 19/463 382/251 |
| 2015/0245318 A1 | 8/2015 | Borst et al. |
| 2015/0271496 A1 * | 9/2015 | Choi .................... H04N 19/154 375/240.03 |
| 2015/0281709 A1 | 10/2015 | Bracha et al. |
| 2015/0286853 A1 | 10/2015 | Shapovalova et al. |
| 2015/0341667 A1 | 11/2015 | Liao et al. |
| 2015/0350714 A1 | 12/2015 | Normile et al. |
| 2015/0381989 A1 * | 12/2015 | Lee ........................ H04N 19/15 375/240.02 |
| 2016/0014418 A1 * | 1/2016 | Shao .................... H04N 19/184 375/240.02 |
| 2016/0021376 A1 | 1/2016 | Andreopoulos et al. |
| 2016/0021380 A1 | 1/2016 | Li et al. |
| 2016/0037176 A1 | 2/2016 | Chari |
| 2016/0088322 A1 | 3/2016 | Horev et al. |
| 2016/0105728 A1 | 4/2016 | Schmidmer et al. |
| 2016/0212432 A1 | 6/2016 | Wang et al. |
| 2016/0295250 A1 | 10/2016 | Yang et al. |
| 2016/0330439 A1 | 11/2016 | Yu et al. |
| 2016/0358321 A1 | 12/2016 | Xu et al. |
| 2017/0109584 A1 | 4/2017 | Yao et al. |
| 2017/0177975 A1 | 6/2017 | Yu et al. |
| 2017/0180736 A1 * | 6/2017 | Yang .................. H04N 21/2402 |
| 2017/0186147 A1 | 6/2017 | He et al. |
| 2017/0237983 A1 | 8/2017 | Adumilli et al. |
| 2017/0280158 A1 | 9/2017 | Kapik et al. |
| 2017/0295375 A1 | 10/2017 | Lee |
| 2017/0359580 A1 | 12/2017 | Su et al. |
| 2017/0359582 A1 | 12/2017 | Kawano et al. |
| 2017/0366587 A1 * | 12/2017 | Sharifi ............... H04N 21/4826 |
| 2017/0374375 A1 | 12/2017 | Makar et al. |
| 2018/0041765 A1 | 2/2018 | Hua et al. |
| 2018/0041788 A1 | 2/2018 | Wang et al. |
| 2018/0063549 A1 | 3/2018 | Amer et al. |
| 2018/0068195 A1 | 3/2018 | Kalarov et al. |
| 2018/0091386 A1 | 3/2018 | Lund |
| 2018/0121733 A1 | 5/2018 | Joshi et al. |
| 2018/0124146 A1 | 5/2018 | Chen et al. |
| 2018/0160161 A1 | 6/2018 | Rezunik et al. |
| 2018/0240017 A1 | 8/2018 | Huszar et al. |
| 2018/0288440 A1 | 10/2018 | Chao |
| 2018/0367799 A1 | 12/2018 | Carmel et al. |
| 2019/0158564 A1 | 5/2019 | Wang et al. |
| 2019/0213481 A1 | 7/2019 | Godard et al. |

FOREIGN PATENT DOCUMENTS

| | | | |
|---|---|---|---|
| CN | 104935926 A | * 9/2015 | ........... H04N 19/154 |
| CN | 105828069 A | 8/2016 | |
| CN | 105933705 A | 9/2016 | |
| CN | 106131597 A | 11/2016 | |
| CN | 106604026 A | * 4/2017 | |
| JP | 2004-521580 A | 7/2004 | |
| WO | 03/005726 A2 | 1/2003 | |
| WO | 2008/077160 A1 | 7/2008 | |
| WO | WO-2013056123 A2 | * 4/2013 | ......... H04L 41/5067 |
| WO | WO-2015031982 A1 | * 3/2015 | ........... H04N 19/154 |
| WO | 2016/183011 A1 | 11/2016 | |

(56) References Cited

FOREIGN PATENT DOCUMENTS

| WO | WO-2016202888 A1 * | 12/2016 | ....... H04N 21/44204 |
| WO | 2016/080354 A1 | 8/2017 | |

OTHER PUBLICATIONS

Weisi Lin, C.-C. Jay Kuo, Perceptual visual quality metrics: A survey, Journal of Visual Communication and Image Representation, vol. 22, Issue 4, (Year: 2011).*

Xu et al., "Blind Image Quality Assessment Based on High Order Statistics Aggregation", IEEE Transactions on image Processing, vol. 25, No. 9, Sep. 2016, pp. 4444-4457.

Narwaria et al., "Low-Complexity Video Quality Assessment Using Temporal Quality Variations", IEEE Transactions an Multimedia, vol. 14, No. 3, Jun. 2012, pp. 525-535.

International Telecommunications Union, "Parametric non-intrusive assessment of audiovisual media streaming quality", Series P:Terminals and Subjective and Objective Assessment Methods—Models and tools for quality assessment of streamed media, Recommendation ITU-T p. 1201, Oct. 2012, 32 pages.

Vranjes et al., "Influence of spatial and temporal activity of upscaled video on its perceived quality," Proceedings ELMAR-2014, Zadar, 2014, pp. 1-4.

Non Final Office Action received for U.S. Appl. No. 17/093,456 dated Dec. 24, 2021, 27 pages.

Xue et al., "Perceptual Video Quality Assessment on a Mobile Platform Considering Both Spatial Resolution and Quantization Artifacts", 18th IEEE International Packet Video Workshop, Dec. 13-14, 2010, pp. 201-208.

Notice of Allowance received for U.S. Appl. No. 17/093,456 dated Jul. 12, 2022, 15 pages.

* cited by examiner

DEVICE-CONSISTENT TECHNIQUES FOR PREDICTING ABSOLUTE PERCEPTUAL VIDEO QUALITY

CROSS-REFERENCE TO RELATED APPLICATIONS

The present application is a continuation of U.S. patent application Ser. No. 15/782,590 filed Oct. 12, 2017, which claims priority benefit of the United States Provisional Patent Application titled, "SOURCE-CONSISTENT AND PER-DEVICE VIDEO QUALITY ASSESSMENT," filed on Dec. 12, 2016 and having Ser. No. 62/432,870. The subject matter of these related applications is hereby incorporated herein by reference.

BACKGROUND OF THE INVENTION

Field of the Invention

Embodiments of the present invention relate generally to video technology and, more specifically, to device-consistent techniques for predicting absolute perceptual video quality.

Description of the Related Art

Efficiently and accurately encoding source video content is critical for real-time delivery of high-quality video content. Because of variations in encoded video content quality, it is desirable to implement quality controls to ensure that the visual quality of decoded video content derived from the encoded video content is acceptable. Manually verifying the visual quality of decoded video content is prohibitively time consuming. Accordingly, automated video content quality assessment is often an integral part of the encoding and streaming infrastructure. For example, automated video quality assessment can be employed when evaluating encoders and fine-tuning streaming bitrates to optimize encoded video content quality.

Some approaches to automatically assessing the quality of encoded video content involve computing scores for a perceptive quality metric based on subjective viewer ratings of the visual quality of decoded video content derived from encoded video content. For explanatory purposes, a discrete portion of source video content is referred to herein as a "source," the encoded video content derived from a source is referred to herein as an "encode," and the decoded video content derived from the encoded video content is referred to herein as a "decode." One limitation of computing and evaluating scores for perceptive quality metrics is that the metrics typically estimate the quality of the decode relative to the quality of the source. However, because the quality of sources may differ, the computed scores of the perceptive quality metrics do not necessarily reflect human perception of the quality of encodes in a comprehensive fashion.

For example, suppose that the source "A" has a spatial resolution of 480p and appears blurry to viewers, while the source "B" has a spatial resolution of 1080p and appears sharp to viewers. Further, suppose that the computed scores for both the encode "EA" derived from the source "A" and the encode "EB" derived from the source "B" are 100. Finally, suppose that a score of 100 indicates that the visual quality of a decode derived from an encode is perceptively identical to the visual quality of the source from which the encode was derived. In apparent contradiction to the scores being identical, the decode derived from the encode "EA" would appear blurry to viewers, while the decode derived from the encode "EB" would appear sharp to viewers.

Another limitation of computing and evaluating perceptive quality metrics is that the subjective viewer ratings are typically obtained based on viewings of decodes via a particular type of device (e.g., a television). For example, suppose that a source is encoded at 2000 kilobits per second (Kbps) to generate an encode "EA," and the source is encoded at 3000 Kbps to generate a different encode "EB." Because the decode derived from the encode EA appears inferior to the decode derived from the encode EB when viewed on the television, the score of the encode EA is lower than the score of the encode EB. However, despite the difference in scores, the decode derived from the encode EA and the decode derived from the encode EB could appear perceptually indistinguishably when viewed on a phone.

As the foregoing illustrates, what is needed in the art are more effective techniques for predicting the perceived quality of decoded video content derived from encoded video content.

SUMMARY OF THE INVENTION

One embodiment of the present invention sets forth a computer-implemented method for predicting absolute video quality. The method includes determining a first absolute quality score for first encoded video content viewed on a baseline viewing device; determining that a first value of a first type for a first viewing device is not equal to a base value of the first type for the baseline viewing device; and computing a second absolute quality score for the first encoded video content viewed on the first viewing device based on the first absolute quality score and the first value, where the second absolute quality score is aggregated with one or more other absolute quality scores in evaluating the visual quality of streamed media content.

One advantage of the disclosed techniques for estimating absolute video quality is that the absolute quality score robustly predicts perceived video quality across a diverse range of viewing devices. In particular, for a target viewing device, the techniques compute the absolute quality score that reflects a perceived quality of encoded video content viewed on the target viewing device. Consequently, the perceptual quality score allows meaningful comparison and effective optimization operations involving the encoded video content as as perceived when viewed on the target viewing device.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skilled in the art that the present invention may be practiced without one or more of these specific details.

In sum, the disclosed techniques may be used to efficiently and reliably predict an absolute quality score for encodes derived from sources. Initially, for each of any number of different spatial resolutions, a training subsystem trains a corresponding source model based on training sources having the spatial resolution. For an encode derived from a source having a particular spatial resolution, the source model corresponding to the spatial resolution associates an objective value set for the encode and absolute quality score for the encode viewed on a base viewing device. For each of any number of additional device types, a conversion subsystem generates a corresponding device equation based on a human-videos viewings of training encodes on the base viewing device and human-video viewings of the training encodes on an additional viewing device having the additional device type.

To determine the absolute quality score for a target encode, a perceptual quality calculator sets a target model equal to a source model associated with the spatial resolution of the source from which the target encode was derived. The perceptual quality calculator then computes a base quality score associated with the target encode based on the target model and a set of objective metrics for the target encode. If the target device type associated with the viewing device on which the target encode is to be viewed is equal to the base device type, then the perceptual quality calculator sets the absolute quality score associated with the encode equal to the base quality score associated with the encode. If, however, the target device type does not equal the base device type, then the perceptual quality calculator sets a target device equation equal to the device equation associated with the target device type. The perceptual quality calculator then computes the absolute quality score for the target encode based on the target device equation and the base quality score for the target encode. Advantageously, the absolute quality score for a target encode on a target viewing device accurately reflects both the resolution of the source from which the encode was derived and the target viewing device.

Perceptual Quality Modeling System Overview

Figure 1:
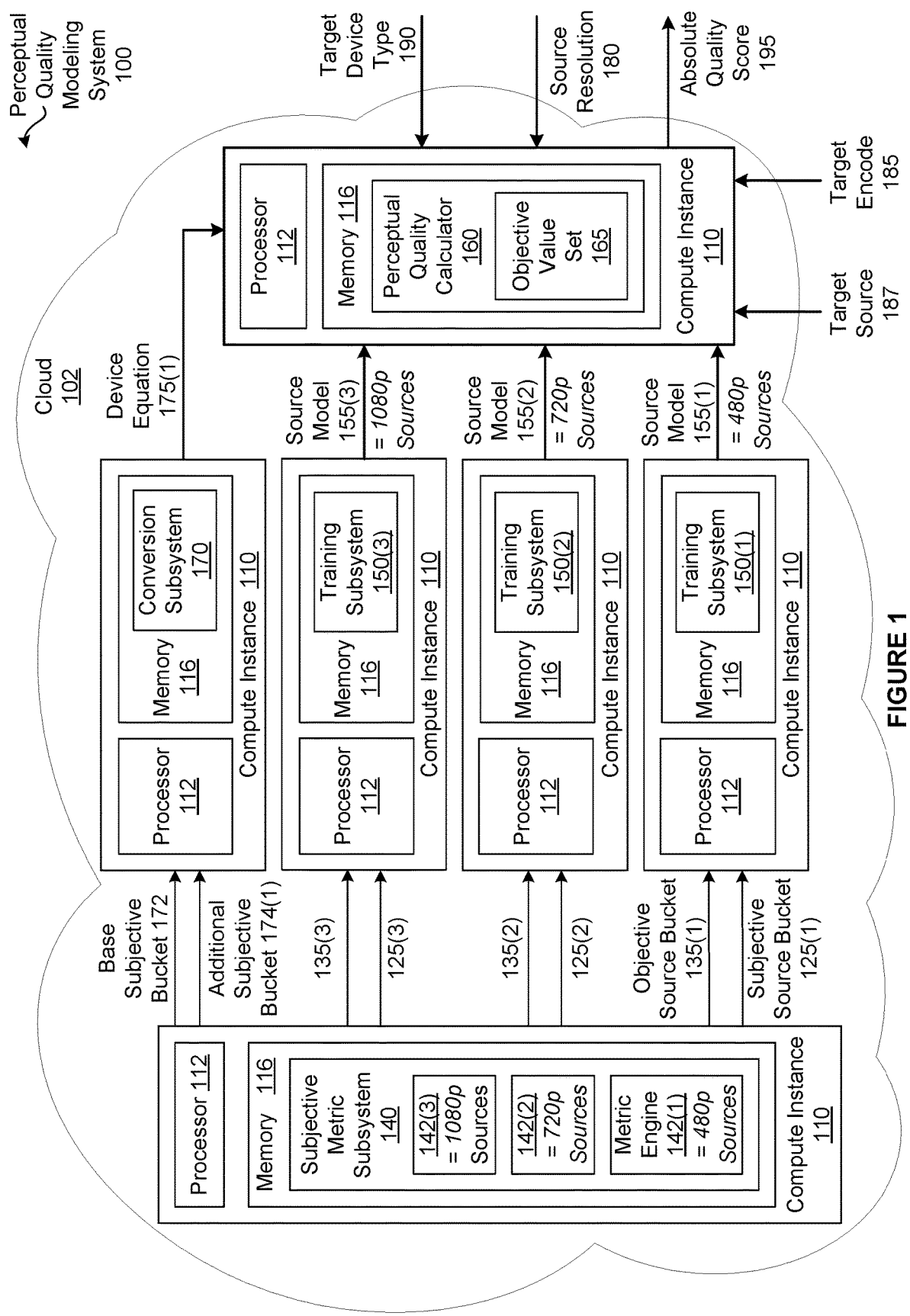
FIG. 1 is a conceptual illustration of a perceptual quality modeling system configured to implement one or more aspects of the present invention.

FIG. 1 is a conceptual illustration of a perceptual quality modeling system 100 configured to implement one or more aspects of the present invention. As shown, the perceptual quality modeling system 100 includes, without limitation, a cloud (i.e., encapsulated shared resources, software, data, etc.) 102. The cloud 102 may be connected to any number and type of devices capable of transmitting input data and/or displaying video content. Examples of such devices include, without limitation, game consoles, smart phones, smart televisions, laptops, tablets, and desktop computers. Devices that are capable of displaying video content are also referred to herein as "viewing devices." For explanatory purposes, multiple instances of like objects are denoted with reference numbers identifying the object and parenthetical numbers identifying the instance where needed.

The cloud 102 includes, without limitation, any number and type of compute instances 110. The cloud 102 receives input user information from an input device (e.g., a laptop), one or more computer instances 110 operate on the user information, and the cloud 102 transmits processed information to the user. The cloud 102 conveys output information to the user via display capabilities of any number of devices, such as a conventional cathode ray tube, liquid crystal display, light-emitting diode, or the like.

In alternate embodiments, the perceptual quality modeling system 100 may include any distributed computer system instead of the cloud 102. In other embodiments, the perceptual quality modeling system 100 does not include the cloud 102 and, instead, the perceptual quality modeling system 100 includes a single computing unit that implements any number of processing units (e.g., central processing units and/or graphical processing units in any combination).

As shown, each of the compute instances 110 includes, without limitation, a processor 112 and a memory 116. The processor 112 may be any instruction execution system, apparatus, or device capable of executing instructions. For example, the processor 112 could comprise a central processing unit (CPU), a graphics processing unit (GPU), a controller, a microcontroller, a state machine, or any combination thereof. The memory 116 stores content, such as software applications and data, for use by the processor 112 of the compute instance 110.

The memory 116 may be one or more of a readily available memory, such as random access memory (RAM), read only memory (ROM), floppy disk, hard disk, or any other form of digital storage, local or remote. In some embodiments, a storage (not shown) may supplement or replace the memory 116. The storage may include any number and type of external memories that are accessible to the processor 112. For example, and without limitation, the storage may include a Secure Digital Card, an external Flash memory, a portable compact disc read-only memory (CD-ROM), an optical storage device, a magnetic storage device, or any suitable combination of the foregoing.

In general, the compute instances 110 included in the cloud 102 are configured to implement one or more applications and/or one or more subsystems of applications. For explanatory purposes only, each application and each subsystem is depicted as residing in the memory 116 of a single compute instance 110 and executing on a processor 112 of the single compute instance 110. However, as persons skilled in the art will recognize, the functionality of each application and subsystem may be distributed across any number of other applications and/or subsystems that reside in the memories 116 of any number of compute instances 110 and execute on the processors 112 of any number of compute instances 110 in any combination. Further, the functionality of any number of applications and/or subsystems may be consolidated into a single application or subsystem.

In general, the perceptual quality modeling subsystem 100 provides automated video content quality assessment for encoded video content. The video content quality assessment may be used to implement quality controls associated with an encoding and streaming infrastructure. For example, to ensure an acceptable viewing experience, the quality of encoded video content and, indirectly, the caliber of the elements included in the encoding and streaming infrastructure are typically evaluated at various points in the design and delivery process using quality metrics. The values for the quality metrics are then used to guide the development of applications (e.g., encoders) and the real-time optimization of content delivery, such as stream-switching algorithms that are quality-aware.

Some conventional approaches to automatically assessing the quality of encoded video content, involve computing scores for a conventional perceptive quality metric based on subjective viewer ratings of the visual quality of decoded video content derived from encoded video content. For explanatory purposes, a discrete portion of source video content is referred to herein as a "source," the encoded video content derived from a source is referred to herein as an "encode," and the decoded video content derived from the encoded video content is referred to herein as a "decode." One limitation of computing and evaluating scores for conventional perceptive quality metrics is that the metrics typically estimate the quality of the decode relative to the quality of the source. However, because the quality of sources may differ, the computed scores of the conventional perceptive quality metrics do not necessarily reflect human perception of the quality of encodes in a comprehensive fashion.

For example, suppose that the source "A" has a spatial resolution of 480p and appears blurry to viewers, while the source "B" has a spatial resolution of 1080p and appears sharp to viewers. Further, suppose that the scores for both the encode "EA" derived from the source "A" and the encode "EB" derived from the source "B" are 100. Finally, suppose that a conventional score of 100 indicates that the visual quality of an decode derived from an encode is perceptively identical to the visual quality of the source from which the encode was derived. In apparent contradiction to the scores being identical, the decode derived from the encode "EA" would appear blurry to viewers, while the decode derived from the encode "EB" would appear sharp to viewers.

Another limitation of computing and evaluating conventional perceptive quality metrics is that the subjective viewer ratings are typically obtained based on viewings of decodes via a particular type of viewing device (e.g., a smart television). For example, suppose that a source is encoded at 2000 kilobits per second (Kbps) to generate an encode "EA," and the source is encoded at 3000 Kbps to generate a different encode "EB." Because the decode derived from the encode EA appears inferior to the decode derived from the encode EB when viewed on the smart television, the score of the encode EA is significantly lower than the score of the encode EB. However, despite the difference in scores, the decode derived from encode EA and the decode derived from encode EB could appear perceptually indistinguishably when viewed on a smart phone with a relatively small, low resolution display.

Instituting an Absolute Perceptual Quality Metric

For these reasons, one or more of the compute instances 110 in the perceptual quality model system 100 implement techniques to institute an absolute perceptual quality metric. As shown, the perceptual quality model system 100 includes, without limitation, a subjective metric subsystem 140, any number of training subsystems 150, any number of conversion subsystems 170, and a perpetual quality calculator 160. Each of the subjective metric subsystem 140, the training subsystems 150, the conversion subsystems 170, and the perpetual quality calculator 160 reside in the memory 116 associated with one or more of the compute instances 110 and execute on the processor 112 associated with one or more of the compute instances 110.

In general, the perceptual quality model system 100 operates in two different phases. A training phase is depicted with non-bold lines and boxes, and a prediction phase is depicted with bold lines and boxes. In the training phase, each of the training subsystems 150 generates a source model 155 associated with a different source resolution 180, and each of the conversion subsystems 170 generates a device equation 175 associated with a different device type. The source resolution 180 is a spatial resolution of a source from which an encode is derived. The device type is a type associated with any number of viewing devices having similar viewing-related properties. For explanatory purposes only, viewing a decoded version of an encode is also referred to herein as "viewing the encode."

Each of the source models 155 associates an objective value set 165 for an encode and an absolute quality score 195 for the encode viewed on a base viewing device (not shown in FIG. 1). The absolute quality score 195 of a particular encode viewed on a base viewing device is also referred to herein as "the base quality score" of the encode. The objective value set 165 is a set of values for a set of objective metrics. In a complementary fashion, each of the device equations 175 specifies a conversion between the base quality score of an encode and the absolute quality score 195 of the encode viewed on a target viewing device having the associated device type.

Subsequently, in the prediction phase, a perceptual quality calculator 160 computes the absolute quality score 195 for a target encode 185 based on the target encode 185, a target source 187, the source resolution 180, and a target device type 190. The target source 187 is the source from which the target encode 185 is derived. The target device type 190 specifies a device type that characterizes the target viewing device on which the target encode 185 is to be viewed. The perceptual quality calculator 160 is also referred to herein as the perceptual quality application.

In operation, the perceptual quality calculator 160 selects one of the source models 155 based on the source resolution 180 as the target model. The perceptual quality calculator 160 then computes the objective value set 165 associated with the target encode 185 based on the target encode 185 and the target source 187. The perceptual quality calculator 160 may compute the objective value set 165 in any technically feasible fashion. Subsequently, the perceptual quality calculator 160 computes the base quality score for the target encode 185 based on the target model and the objective value set 165 associated with the target encode 185.

If the target device type 190 equals the base device type, then the perceptual quality calculator 160 sets the absolute quality score 195 equal to the base quality score. If, however, the target device type 190 is not equal to the base device type, then the perceptual quality calculator 160 selects the device equation 175 associated with the target device type 190 as the target device equation. The perceptual quality calculator 160 computes the absolute quality score 195 based on the target device equation and the base quality score.

For explanatory purposes only, the perceptual quality modeling system 100 is configured to differentiate between three different source resolutions 180 and two different target device types 190 (one base device type and one additional device type). In alternate embodiments, the perceptual quality modeling system 100 may differentiate between any number of source resolutions 180 (including zero) and any number of target device types 190 (including zero) in any combination. For instance, in some alternate embodiments, the perceptual quality model system 100 differentiates between four different source resolutions 180 (e.g., 480p, 720p, 1080p, and 4K). In the same or other alternate embodiments, the target device type 190 may specify any number of characteristics associated with any number of viewing devices. For example, the target device type 190 could specify a spatial resolution associated with the viewing device instead of or in addition to a type of the target viewing device.

As shown, the subjective metric subsystem 140 includes, without limitation, three metric engine 142 (i.e., three instances of the metric engine 142). Each of the metric engines 142 is associated with an assigned spatial resolution (not shown in FIG. 1) and a different assigned source bucket (not shown in FIG. 1). The metric engine 142(1) is associated with the assigned spatial resolution of 480p, the metric engine 142(2) is associated with the assigned spatial resolution of 720p, and the metric engine 143(3) is associated with the assigned spatial resolution of 1080p.

During the training phase, upon receiving any number of sources, the subjective metric subsystem 140 assigns each of the sources to one of the assigned source buckets based on the spatial resolution of the source. The subjective metric subsystem 140 assigns sources having a spatial resolution equal to 480p to the assigned source bucket associated with the metric engine 142(1). The subjective metric subsystem 140 assigns sources having a spatial resolution equal to 720p to the assigned source bucket associated with the metric engine 142(2). The subjective metric subsystem 140 assigns sources having a spatial resolution equal to 1080p to the assigned source bucket associated with the metric engine 142(3).

Figure 2:
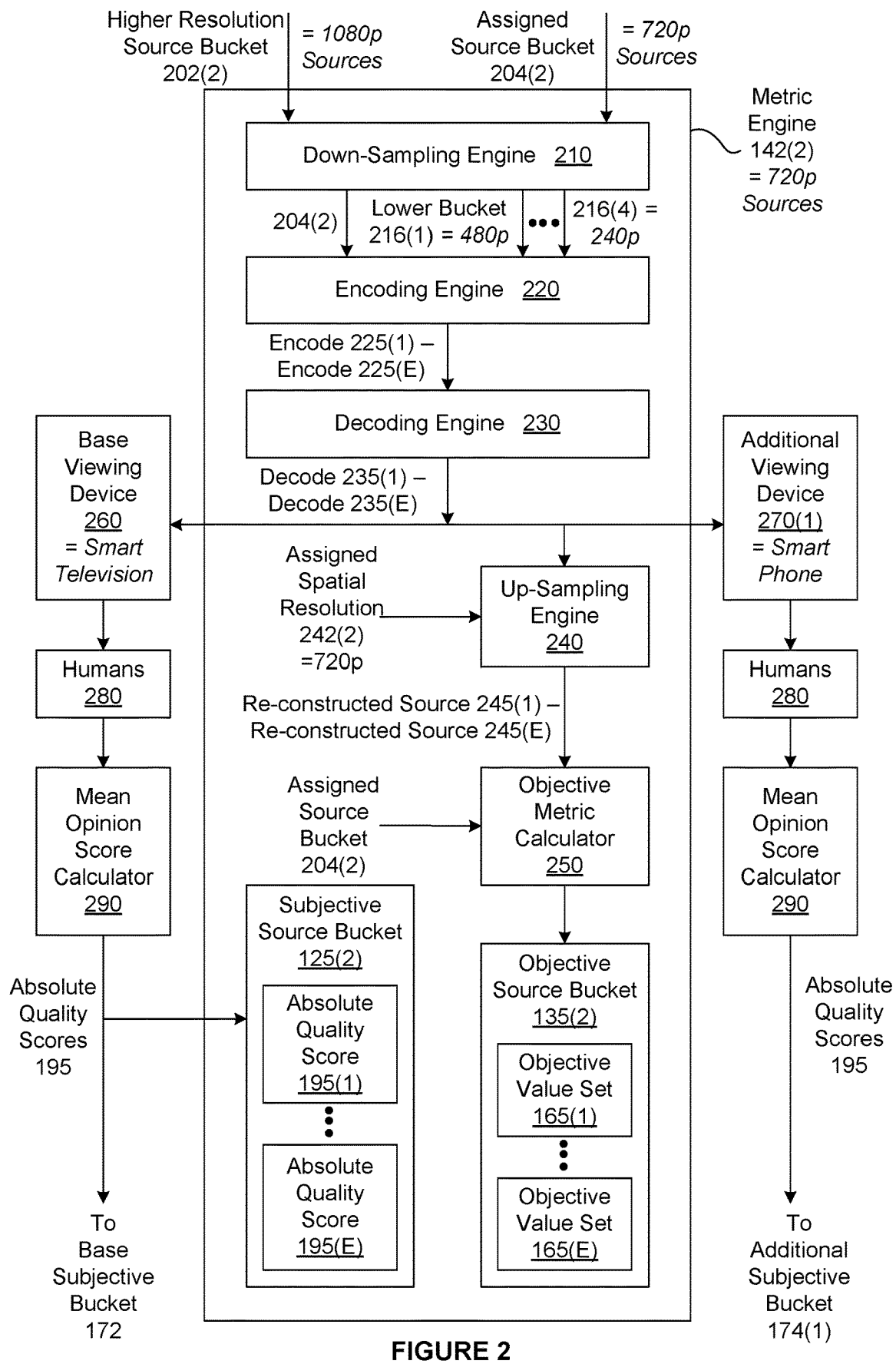
FIG. 2 is a more detailed illustration of the metric engine of FIG. 1, according to various embodiments of the present invention.

As described in greater detail in conjunction with FIG. 2, each metric engine 142(i) derives encodes from the sources included in the assigned source bucket, generates an objective source bucket 135(i), and generates a subjective source bucket 125(i). The objective source bucket 135(i) includes an objective value set 165 for each encode generated by the metric engine 142(i). The objective value set 165 is a set of values for the set of objective metrics. Examples of objective metrics include a visual information fidelity (VIF), a detail loss measure (DLM) an additive impairment measure (ADM), a visual information fidelity (VIF), a blind/referenceless image spatial quality evaluator (BRISQUE), and a temporal information (TI). The metric engine 142(i) may compute the objective value sets 165 included in the objective source bucket 135(i) in any technically feasible fashion.

The subjective source bucket 125(i) includes an absolute quality score 195 for each encode generated by the metric engine 142(i). The absolute quality score 195 is derived from values for the absolute perceptual quality metric assigned by humans after viewing the encodes generated by the metric engine 142(i) on a base viewing device (e.g., a smart television). The human-observed values may be obtained via any type of absolute rating process. For instance, the human-observed values could be determined via an absolute category rating testing process. For each encode, the absolute quality score 195 may be computed in any technically feasible fashion and by any software application. For example, the metric engine 142(i) could compute the mean opinion score (MOS) based on the human-observed values for the absolute perceptual quality metric, and then set the absolute quality score 195 equal to the MOS.

The subjective metric subsystem 140 also generates a base subjective bucket 142 that includes the absolute quality scores 195 derived from values for the absolute perceptual quality metric assigned by humans after viewing the unique encodes on the base viewing device. For explanatory purposes only, "unique encodes" refer to the set of encodes generated by the metric engines 142 after any duplicate encodes are removed. Further, for each additional device type, the subjective metric subsystem 140 generates an additional subjective bucket 144 that includes the absolute quality scores 195 derived from values for the absolute perceptual quality metric assigned by humans after viewing the unique encodes on an additional viewing device associated with the additional device type. As shown, the subjective metric subsystem 140 generates one additional subjective bucket 144(1). In alternate embodiments, the subjective metric subsystem 140 may generate any number of additional subjective buckets 144.

Each of the training subsystems 150(i) receives the objective source bucket 135(i) and the subjective source bucket 125(i) generated by an associated metric engine 142(i), and generates the source model 155(i). Accordingly, the training subsystem 150(i) and the source model 155(i) are associated with the assigned spatial resolution that characterizes the sources assigned to the metric engine 142(i). As shown, the training subsystem 150(1) and the source model 155(1) are associated with the spatial resolution of 480p. The training subsystem 150(2) and the source model 155(2) are associated with the spatial resolution of 720p. The training subsystem 150(3) and the source model 155(3) are associated with the spatial resolution of 1080p.

In operation, the training subsystem 150 generates the source model 155 via a machine learning algorithm trained on the objective source bucket 135 and the subjective source bucket 125. More specifically, each of the objective value sets 165 included in the the objective source bucket 135 is associated with a particular encode and, consequently, a corresponding absolute quality score 195 included in the subjective source bucket 125. For each of the objective value sets 165, the training subsystem 150 trains the source model 155 to associate the objective value set 165 and the corresponding absolute quality score 195. The training subsystem 150 may implement any type of machine learning algorithm in any technically feasible fashion. For example, the training subsystem 150 could implement a support vector machine algorithm, an artificial neural network algorithm, or a random forest algorithm, to name a few.

For each additional device type, an instance of the conversion subsystem 170(i) receives the base subjective bucket 172 and the additional subjective bucket 174(i), and generates the device equation 175(i). The device equation 175(i) defines a relationship between the base quality score of an encode and the absolute quality score 195 for the encode viewed on a viewing device characterized by the associated additional device type. The conversion subsystem 170 may determine any type of relationship in any technically feasible fashion.

For instance, in some embodiments, the conversion subsystem 170 generates a scatter plot, where each point included in the scatter plot is associated with a different encode. The horizontal coordinate of a particular point represents the absolute quality score 195 for the associated encode that is included in the base subjective bucket 172. The vertical coordinate of the point represents the absolute quality score 195 for the associated encode that is included in the associated additional subjective bucket 174. The conversion subsystem 170 then performs curve fitting operations on the scatter plot to generate a polynomial. The polynomial expresses the absolute quality score 195 for an encode viewed on an additional viewing device based on the absolute quality score 195 of the encode viewed on the base viewing device Finally, at the end of the training phase, the perceptual quality calculator 160 receives the source models 155(1)-155(3) and the device equation 175(1). In alternate embodiments, the perceptual quality calculator 160 may receive any number of source models 155 and any number of device equations 175. During the prediction phase, the perceptual quality calculator 160 receives target inputs. The "target inputs" include, without limitation, the target encode 185, the target source 187, the source resolution 180, and the target device type 190. In response to receiving the target inputs, as described in greater detail in conjunction with FIG. 3, the perceptual quality calculator 160 generates the absolute quality score 195 for the target encode 185 viewed on a target viewing device characterized by the target device type 190.

Until the perceptual quality calculator 160 receives a command to stop executing, as the perceptual quality calculator 160 receives new target inputs, the perceptual quality calculator 160 generates corresponding absolute quality scores 195. Advantageously, because the each of the absolute quality scores 195 reflects the source resolution 180 and the target device type 190, the absolute quality scores 195 correlate in a universal and absolute manner to subjective human visual experiences when viewing encodes on target viewing devices.

Advantageously, any number of the absolute quality scores 195 may be aggregated to generate an aggregate quality score as part of evaluating the visual quality of streamed media content. For example, a dashboard application that monitors a streaming service on a daily basis can indicate the health of the streaming service based on the aggregated quality score. In general, unless a change occurs to the streaming service, the aggregated quality score remains stable. Consequently, a deviation in the aggregated quality score between a particular day and the immediately proceeding day indicates an change to the streaming service (e.g., an issue or an improvement) that impacts the visual quality of the streamed media content. By contrast, if a change to the streaming service is not intended to effect the visual quality of the streamed media content, then the aggregated quality score can provide confirmation that the visual quality of the streamed media content is unaffected. For instance, if a new encode for a smart phone saves bandwidth while preserving visual quality, then the aggregated quality score remains stable while a time-weighted bitrate decreases.

In another example, an NB test application compares a control group of streaming sessions with one or more treatment groups of streaming sessions. A treatment group differs from the control group in exactly one key parameter. The aggregated quality score indicates whether the visual quality of the streamed media content is impacted by the difference in the key parameter. For instance, if the treatment group uses a new encode and the control group uses a current encode, then the A/B test application could compare the aggregated quality score for the control group and the aggregated quality score for the treatment group. The results of the comparison indicates whether the new encode impacts the visual quality of streamed media content for the treatment groups.

Note that the techniques described herein are illustrative rather than restrictive, and may be altered without departing from the broader spirit and scope of the invention. Many modifications and variations on the functionality provided by the subjective metric subsystem 140, the training subsystems 150, the conversion subsystems 170, and the perpetual quality calculator 160 will be apparent to those of ordinary skill in the art without departing from the scope and spirit of the described embodiments. For instance, in various embodiments, any number of the techniques or devices may be implemented while other techniques may be omitted or replaced in any technically feasible fashion.

For instance, in some embodiments, the conversion subsystems 170 and the target device type 190 may be omitted from the absolute perceptual quality system 100. In such embodiments, the perceptual quality calculator 160 may be modified to set the absolute quality score 195 equal to the base quality score. In the same or other embodiments, to increase the number of sources assigned to the metric engine 142, the metric engine 142 may include functionality to synthesize additional sources having the assigned spatial resolution based on sources having higher spatial resolutions than the assigned spatial resolution.

It will be appreciated that the absolute perceptual quality system 100 shown herein is illustrative and that variations and modifications are possible. For example the functionality provided by the subjective metric subsystem 140, the training subsystems 150, the conversion subsystems 170, and the perpetual quality calculator 160 as described herein may be integrated into or distributed across any number of software applications (including one) and any number of components of the absolute perceptual quality system 100. Further, the connection topology between the various units in FIG. 1 may be modified as desired.

FIG. 2 is a more detailed illustration of the metric engine 142(2) of FIG. 1, according to various embodiments of the present invention. As shown, the metric engine 142(2) includes, without limitation, a down-sampling engine 210, an encoding engine 220, a decoding engine 230, an up-sampling engine 240, and an objective metric calculator 250. The metric engine 142(2) is associated with an assigned spatial resolution 242(2) of 720p. The assigned spatial resolution 242(2) corresponds to the spatial resolution of the sources included in the assigned source bucket 204(2) that the subjective metric subsystem 140 assigns to the metric engine 142(2).

As shown, the metric engine 142(2) receives the assigned source bucket 204(2) and a higher resolution source bucket 202(2). The assigned source bucket 204(2) includes sources having spatial resolutions of 720p, while the higher resolution bucket 202(2) includes sources having spatial resolutions of 1080p. The down-sampling engine 210 performs down-sampling operations on the higher resolution bucket 202(2) to synthesize additional 720p sources. The down-sampling engine 210 then adds the additional 720p sources to the assigned source bucket 204(2). In alternate embodiments, the metric engine 142(2) may omit the functionality to synthesize additional 720p sources, and the metric engine 142(2) does not receive the higher sources bucket 202(2).

Subsequently, the down-sampling engine 210 and the encoding engine 220 collaborate to generate encodes 225 derived from the sources included in the assigned source bucket 204(2). More precisely, the down-sampling engine 210 performs down-sampling operations on the sources included in the assigned source bucket 204(2) to generate down-sampled sources that are included in four lower buckets 216. The lower bucket 216(1) includes down-sampled sources having spatial resolutions of 480p. The lower bucket 216(2) includes down-sample sources having spatial resolutions of 384p. The lower bucket 216(3) includes down-sampled sources having spatial resolutions of 288p. The lower bucket 216(4) includes down-sample sources having spatial resolutions of 240p. The number and resolutions of the lower buckets 216 may be determined in any fashion that is consistent with the number and type of the encodes 225 desired.

The encoding engine 220 performs encoding operations on the sources included in the assigned source bucket 204(2) and the down-sampled sources included in the lower buckets 216. More specifically for each source and down-sampled source, the encoding engine 220 generates one or more of the encodes 225 based on any number of encoding criteria and in any technically feasible fashion. For instance, in some embodiments, for each source and down-sampled source, the encoding engine 220 generates three different encodes 225, where each of the encodes 225 corresponds to a different quality parameter. As shown, the encoding engine 220 generates the encodes 225(1)-225(E).

For each of the encodes 225, the decoding engine 230 performs decoding operations to generate a corresponding decode 235. As a result, the decoding engine 230 generates the decodes 235(1)-235(E). As shown, the metric engine 142(2) provides the decodes 235 to a base viewing device 260 having a base device type of "smart television," an additional viewing device 270(1) having an additional device type of "smart phone," and an up-sampling engine 240. A smart phone is also referred to herein as a mobile device.

For each of the decodes 235(1)-235(E), humans 280 view the decodes 235(1)-235(E) on the base viewing device 260 and generate associated raw absolute quality scores 195. For each of the decodes 235(1)-235(E), a mean opinion score calculator 290 processes the raw absolute quality scores 195 to generate a single absolute quality score 195. In alternate embodiments, the subjective metric subsystem 140 may process the raw absolute quality scores 195 to generate the quality score 195 in any technically feasible fashion. Accordingly, in some embodiments, the system 100 does not include the mean opinion score calculator 290.

The metric engine 140(2) then creates the subjective source bucket 125(2) that includes the absolute quality scores 195(1)-195(E) associated with the base viewing device 260. In addition, the subjective metric subsystem 140 adds the absolute quality scores 195(1)-195(E) associated with the base viewing device 260 to the base subjective bucket 172.

In a complementary fashion, for each of the decodes 235(1)-235(E), the humans 280 view the decodes 235(1)-235(E) on the additional viewing device 270(1) and generate associated raw absolute quality scores 195. For each of the decodes 235(1)-235(E), a mean opinion score calculation 290 processes the raw absolute quality scores 195 to generate a single absolute quality score 195 associated with the additional viewing device 270(1). The subjective metric subsystem 140 then adds the absolute quality scores 195(1)-195(E) associated with the additional viewing device 270(1) to the additional subjective bucket 174(1).

As persons skilled in the art will recognize, some of the encodes 225 generated by the metric engine 140(2) may be identical to some of the encodes 225 generated by one or more of the other metric engines 140(1) and 140(3). Notably, two encodes 225 that are identical have the same visual quality when decoded and viewed on a particular viewing device. Consequently, in some embodiments, the subjective metric subsystem 140 may reuse the absolute quality score 195 assigned by the humans 280 viewing one of the encodes 225 as the absolute quality score 195 for other, identical encodes 225. Accordingly, the humans 280 view only the unique encodes 225.

In alternate embodiments, the subjective metric subsystem 140 and/or the metric engines 144 may determine the absolute quality scores 195 assigned by the humans 280 in any technically feasible fashion. For example, for each unique encode 225 and each viewing device, the subjective metric subsystem 140 could retrieve raw values for any absolute metric from a database. Subsequently, the subjective metric subsystem 140 could process the raw values to generate the absolute quality score 195 associated with the viewing device.

The up-sampling engine 240 performs up-sampling operations 240 on the decodes 235(1)-235(E) based on the assigned spatial resolution 242(2) to generate re-constructed sources 245(1)-245(E) that match the spatial resolution of the sources includes in the assigned source bucket 204(2). Subsequently, for each of the encodes 235(1)-235(E), the objective metric calculator 250 computes the corresponding objective value set 165 based on the associated source included in the assigned source bucket 204(2) and the associated re-constructed source 245.

The objective metric calculator 250 may compute the objective value set 165 in any technically feasible fashion. For instance, in some embodiments, the objective metric calculator 250 may compare the source to the re-constructed source 245 to determine one or more values included in the objective value set 195 that correspond to full-reference objective metrics. In some alternate embodiments, the objective metric calculator 250 may implement one or more no-reference algorithms to compute one or more values included in the objective value set 195 that correspond to no-reference objective metrics. Because no-reference algorithms do not operate on the source, in some embodiments, the objective metric calculator 250 may not receive the assigned source bucket 204(2). Finally, the objective metric calculator 250 creates the objective source bucket 135(2) that includes the objective value sets 165(1)-165(E).

As persons skilled in the art will recognize, each objective metric may represent any number of deterministic video characteristics and exhibits both strengths and weaknesses. For example, a visual information fidelity (VIF) is relatively good at detecting slight blurring artifacts, but is relatively poor at detecting blocking artifacts. In some embodiments, to leverage the strengths and mitigate the weaknesses, the objective metric calculator 250 may be configured to determine the set of objective metrics 145 that, together, provide valuable insight into the visual quality across a wide range of the encodes 225. The selection of the set of objective metrics may be made in any technically feasible fashion to address any number of anticipated artifacts. For instance, in some embodiments, the set of objective metrics may be empirically selected to assess degradation caused by compression (i.e., blockiness) and scaling (i.e., blurriness).

More precisely, in some embodiments, the set of objective metric include an additive impairment measure (ADM), a visual information fidelity (VIF), a blind/referenceless image spatial quality evaluator (BRISQUE), and a temporal information (TI). Each of these objective metrics may be associated with any number of values, also known as "features." As part of generating the objective value set 165, the objective metric calculator 250 may include any number of features for each objective metric and discard the remainder. For example, in some embodiments, the objective value set 165 specifies values for one ADM feature, four VIF features, twelve BRISQUE features, and one TI feature.

Many modifications and variations on the functionality provided by the subjective metric subsystem 140 and the metric engine 142(2) will be apparent to those of ordinary skill in the art without departing from the scope and spirit of the described embodiments. In particular, modifications of the functionality described in FIG. 2 to reflect different assigned spatial resolutions 242 (e.g., for metric engines 142(1) and 142(3)) will be apparent to those of ordinary skill in the art.

Computing Absolute Quality Scores

Figure 3:
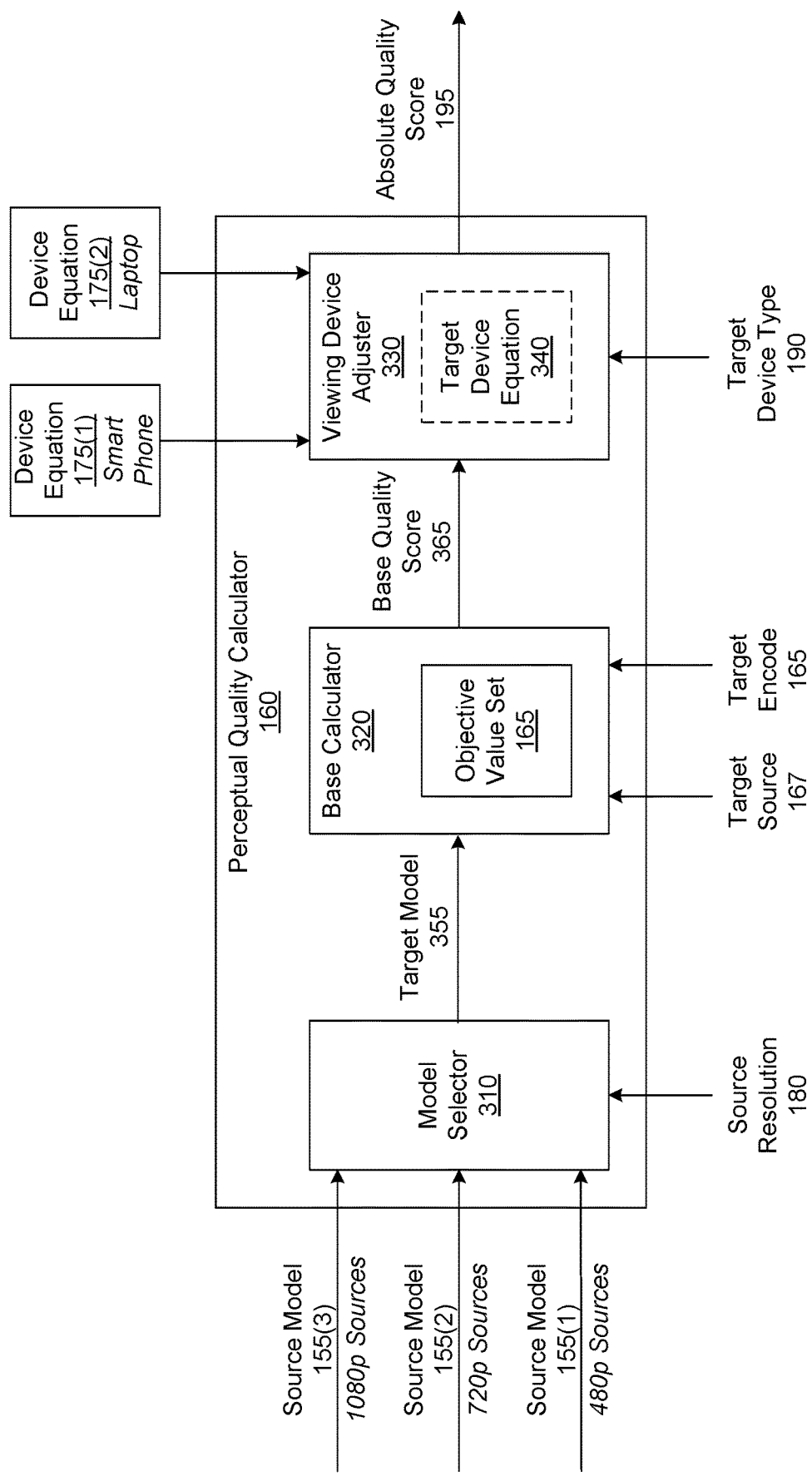
FIG. 3 is a more detailed illustration of the perceptual quality calculator of FIG. 1, according to various embodiments of the present invention.

FIG. 3 is a more detailed illustration of the perceptual quality calculator 160 of FIG. 1, according to various embodiments of the present invention. As shown, the perceptual quality calculator 160 includes, without limitation, a model selector 310, a base calculator 320, and a viewing device adjuster 330. For explanatory purposes only, the base device type is smart television. Further, at the end of the training phase, the perceptual quality calculator 160 receives the source model 155(1), the source model 155(2), the source model 155(3), the device equation 175(1), and the device equation 175(2).

The source model 155(1) is associated with the spatial resolution of 480p. The source model 155(2) is associated with the spatial resolution of 720p. The source model 155(3) is associated with the spatial resolution of 1080p. The device equation 175(1) is associated with the additional device type of smart phone. More specifically, the device equation 175(1) expresses the absolute quality score 195 associated with a device type of smart phone as a function of a base quality score 365. The base quality sore 365 is the absolute quality score 195 associated with the base device type of smart television. For example, the device equation 175(1) could be the following polynomial:

(absolute quality score 195)=0.08492679*(base quality score 365)+0.00879799*(base quality score 365)$^2$    (1)

The device equation 175(2) is associated with the additional device type of laptop. To reflect that the additional device type of laptop is to be considered visually equivalent to the base device type, the associated device equation 175(2) may explicitly set the absolute quality score 195 equal to the base equality score 365. For example, the device equation 175(2) could be:

(absolute quality score 195)=(base quality score 365)    (2)

In alternate embodiments, the perceptual quality calculator 160 and/or the viewing device adjuster 330 may determine that an additional device type is to be considered visually equivalent to the base device type in any technically feasible. In various embodiments, the base device type may include a list of device types. In alternate embodiments, the base device type may specify any number and type of characteristics associated with any number of viewing devices. For example, the base device type could specify a lists of resolutions associated with viewing devices.

During the prediction phase, the perceptual quality calculator 160 receives the source resolution 180, the target source 187, the target encode 185, and the target device type 190. In some embodiments, the perceptual quality calculator 160 may not receive the target device type 190. In such embodiments, the perceptual quality calculator 160 sets the target device type 190 equal to the base device type.

As shown, the model selector 310 selects one of the source models 155 as the target model 355 based on the source resolution 180. More precisely, the model selector 310 performs one or more comparison operations between the source resolution 180 and the different spatial resolutions associated with the source models 155. If the source resolution 180 matches the spatial resolution associated with one of the source models 155, then the model selector 310 selects the source model 155 as the target model 355. For example, if the source resolution 180 was equal to 1080p, then the model selector 310 would select the source model 155(3) as the target model 355.

If, however, the source resolution 180 does not match the spatial resolution associated with one of the source models 155, then the model selector 310 selects the source model 155 associated with the highest spatial resolution that is not greater than the source resolution 180. For example, if the source resolution 180 was equal to 600p, then the model selector 310 would select the source model 155(1) as the target model 355. In alternate embodiments, the model selector 310 may determine the target model 355 in any technically feasible fashion that reflects the source resolution 180.

Subsequently, the base calculator 320 computes a base quality score 365 based on the target model 355, the target encode 185, and the target source 187. First, the base calculator 320 computes the objective value set 165 associated with the target encode 187. The base calculator 320 may compute the objective value set 165 in any technically feasible fashion. For instance, in some embodiments, the base calculator 320 performs decoding operations to generate a target decode. The base calculator 320 performs up-sampling operations on the target decode to generate a re-constructed target source having a spatial resolution equal to the source resolution 180. Subsequently, the base calculator 320 performs comparison operations between the target source 187 and the re-constructed target source to determine one or more values included in the objective value set 195 that correspond to full-reference objective metrics.

In some alternate embodiments, the base calculator 320 may implement one or more no-reference algorithms to compute one or more values included in the objective value set 195 that correspond to no-reference objective metrics. Because no-reference algorithms do not operate on the source, in some embodiments, the perceptual quality calculator 160 may not receive the target source 187. Finally, the base calculator 320 computes the base quality score 365 based on the target model 355 and the objective metric set 165.

The viewing device adjuster 330 compares the target device type 190 to the base device type. If the target device type 190 is equal to the base device type, then the viewing device adjuster 330 sets the absolute quality score 195 equal to the base quality score 365. For example, if the target device type 190(1) is smart television, then the viewing device adjuster 330 sets the absolute quality score 195 equal to the base quality score 365.

If, however, the target device type 190 is not equal to the base device type, then the viewing device adjuster 330 selects one of the device equations 175 as a target device equation 340 based on the target device type 190. More precisely, the viewing device adjuster 330 performs comparison operations between the target device type 190 and the additional device types associated with the device equations 175. The target device adjuster 330 then selects the device equation 175 associated with the additional device type that matches the target device type 190 as the target device equation 340. For example, if the target device type 190(1) is smart phone, then the viewing device adjuster 330 selects the device equation 175(1) as the target device equation 340. The viewing device adjuster 330 then computes the absolute quality score 195 associated with the target device type based on the target device equation 340 and the base quality score 365.

Figure 4:
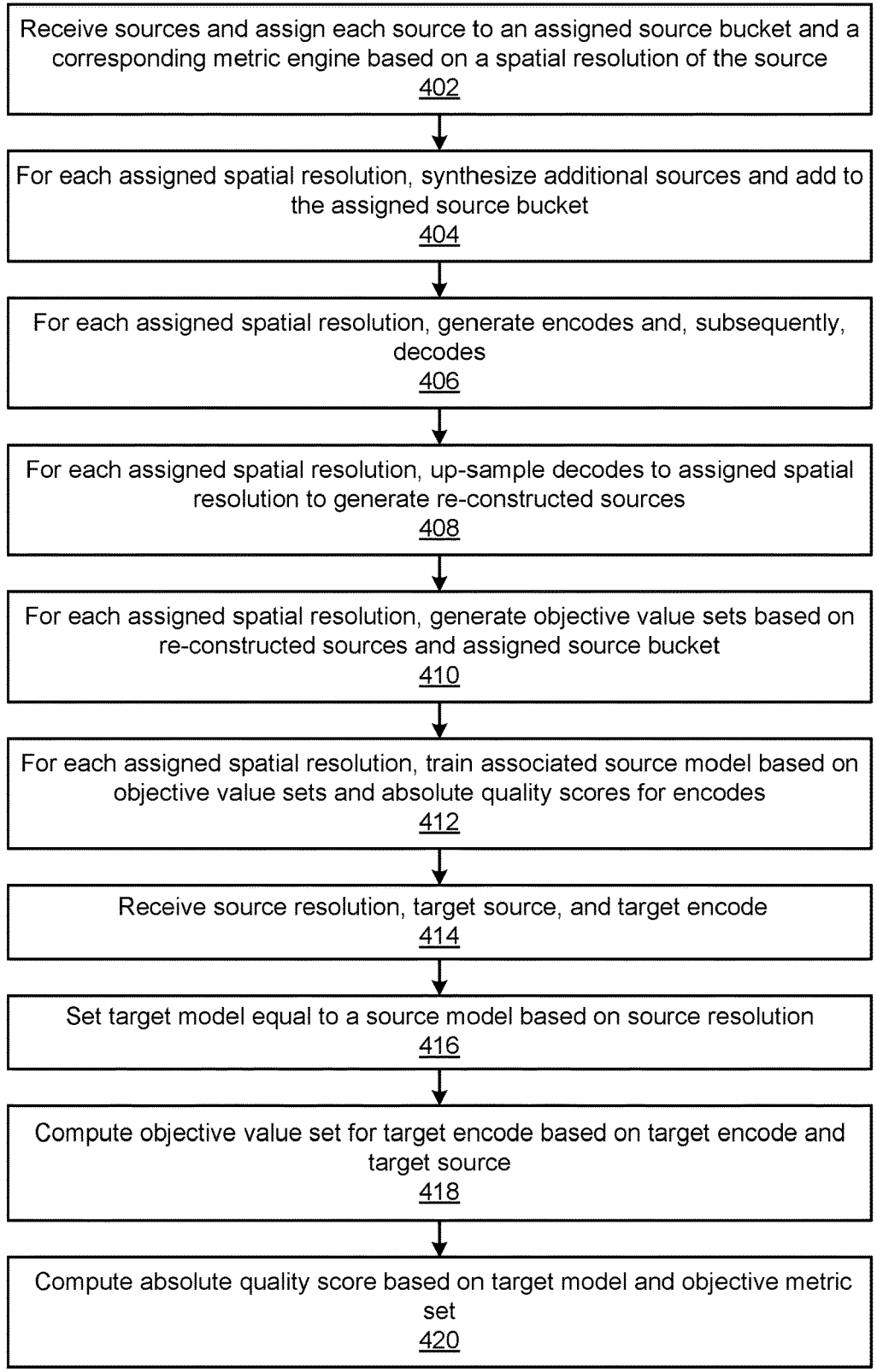
FIG. 4 is a flow diagram of method steps for computing an absolute quality score for encoded video content viewed on a base viewing device, according to various embodiments of the present invention.

FIG. 4 is a flow diagram of method steps for computing an absolute quality score for encoded video content viewed on a base viewing device, according to various embodiments of the present invention. Although the method steps are described with reference to the systems of FIGS. 1-3, persons skilled in the art will understand that any system configured to implement the method steps, in any order, falls within the scope of the present invention.

As shown, a method 400 begins at step 402, where the subjective metric subsystem 140 receives sources and assigns each of the sources to one of the assigned source buckets 204 based on the spatial resolution of the source. More specifically, the subjective metric subsystem 140 assigns the source to the assigned source bucket 204($i$) corresponding to the assigned spatial resolution 242($i$) that equals the spatial resolution of the source. As described previously herein, each of the assigned source buckets 204($i$) is also associated with a different metric engine 142($i$).

At step 404, for each of the assigned spatial resolutions 242($i$), the down-sampling engine 210 performs down-sampling operations to generate additional sources from sources included in the higher source resolution bucket 202($i$). The down-sampling engine 210 then adds the additional sources to the corresponding assigned source bucket 204($i$).

At step 406, for each of the assigned spatial resolutions 242($i$), the down-sampling engine 210 and the encoding engine 220 collaborate to generate one or more encodes 225 for each of the sources included in the corresponding assigned source bucket 204($i$). Subsequently, as part of step 406, the decoding engine 230 performs decoding operations on the encodes 225 to generate the decodes 235.

At step 408, for each of the assigned spatial resolutions 242($i$), the up-sampling engine 240 performs up-sampling operations on the decodes 235 to generate re-constructed sources 245. Notably, the re-constructed sources 245 and the sources included in the corresponding assigned source bucket 204($i$) have the assigned spatial resolution 242($i$). At step 410, for each of the assigned spatial resolutions 242($i$), the objective metric calculator 250 computes the objective value sets 165 included in the corresponding objective source bucket 135($i$) based on the re-constructed sources 245 and the corresponding assigned source bucket 204($i$).

At step 412, for each of the assigned spatial resolutions 242($i$), one of the training subsystems 150 generates the associated source model 155($i$) via a machine learning algorithm trained on the objective source bucket 135($i$) and the corresponding subjective source bucket 125($i$). Importantly, each objective value set 165 included in the objective source bucket 135($i$) is associated with a particular encode 225, and the corresponding subjective source bucket 125($i$) includes the absolute quality score 195 for the encode 225. The absolute quality score 195 for a particular encode 225 is generated based on human video-viewings of the encode 225 on the base viewing device 260. Accordingly, during step 412, each of the source models 155($i$) is trained to associate the objective value set 165 and the absolute quality score 195 for encodes 225 derived from sources having the assigned spatial resolution 242($i$).

At step 414, the perceptual quality calculator 160 receives the source resolution 180, the target source 187, and the target encode 185. Because the perceptual quality calculator 160 does not receive the target device type 190, the perceptual quality calculator 160 sets the target device type 190 equal to the base device type. At step 416, the model selector 310 sets the target model 355 equal to the source model 155 based on the source resolution 180.

At step 418, the base calculator 320 computes the objective value set 165 associated with the target encode 185 based on the target encode 185 and the target source 187. At step 420, the base calculator 320 computes the base quality score 365 based on the target model 355 and the objective value set 165 associated with the target encode 185. Because the target device type 190 is equal to the base device type, the viewing device adjuster 330 sets the absolute quality score 195 equal to the base quality score 365. Subsequently, any number of the absolute quality scores 195 may be aggregated to generate an aggregate quality score as part of evaluating the visual quality of streamed media content. The method 400 then terminates.

Figure 5:
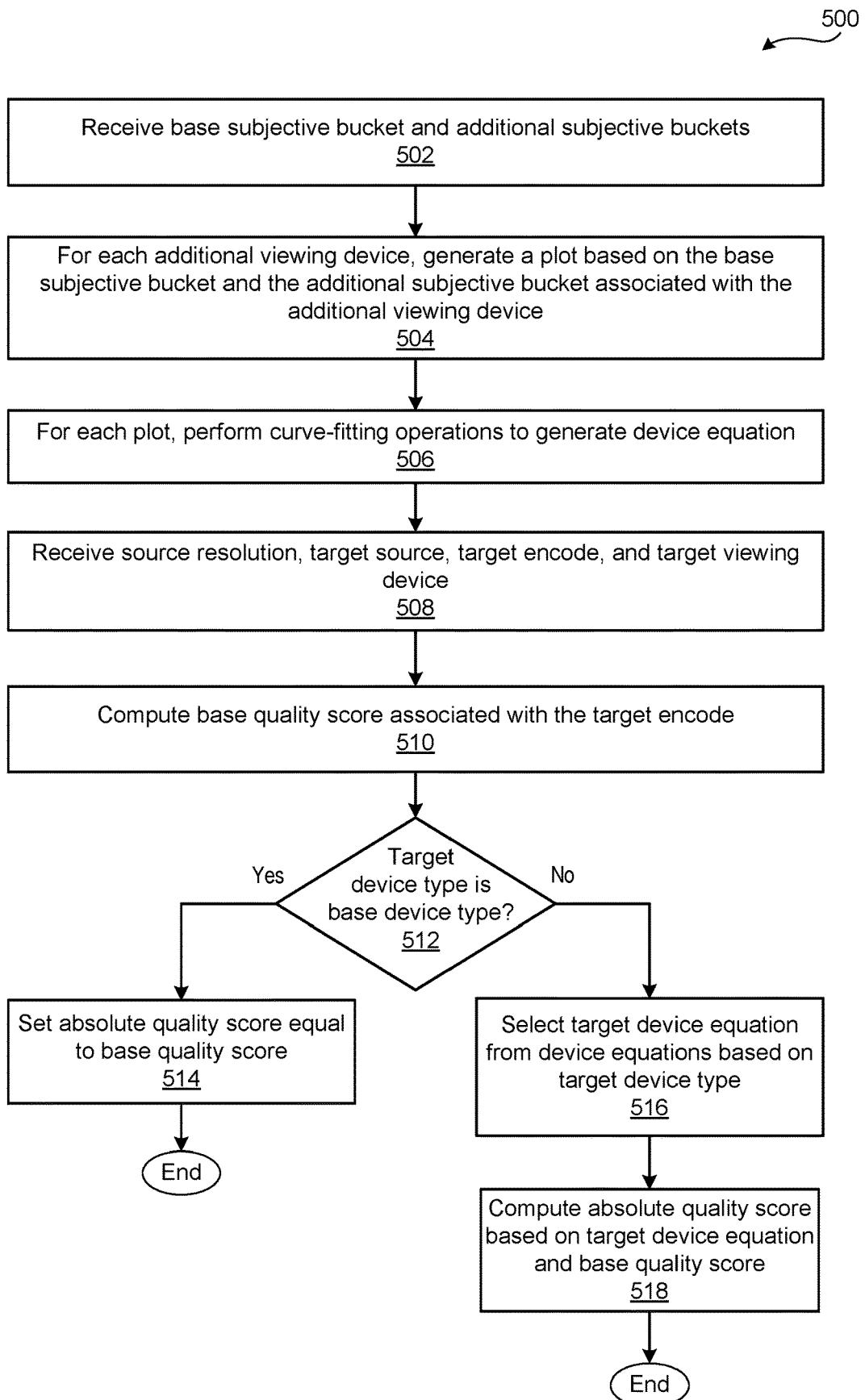
FIG. 5 is a flow diagram of method steps for computing an absolute quality score for encoded video content viewed on a target viewing device, according to various embodiments of the present invention.

FIG. 5 is a flow diagram of method steps for computing an absolute quality score for encoded video content viewed on a target viewing device, according to various embodiments of the present invention. Although the method steps are described with reference to the systems of FIGS. 1-3, persons skilled in the art will understand that any system configured to implement the method steps, in any order, falls within the scope of the present invention.

As shown, a method 500 begins at step 502, where the perceptual quality modeling subsystem 100 receives the base subjective bucket 172 and the additional subjective buckets 174. Each of the additional subjective buckets 174 corresponds to an different additional viewing device 270. At step 504, for each additional viewing device 270($i$), the conversion subsystem 170 generates a plot based on the base subjective bucket 172 and the additional subjective bucket 174($i$) associated with the additional viewing device 270.

Each point included in the plot is associated with a different one of the encodes 225. The horizontal coordinate of a particular point represents the absolute quality score 195 for the associated encode 225 that is included in the base subjective bucket 172. The vertical coordinate of the point represents the absolute quality score 195 for the associated encode 225 that is included in the additional subjective bucket 174($i$). At step 506, for each additional viewing device 270($i$), the conversion subsystem 170 performs one or more curve-fitting operations to generate the associated device equation 175($i$).

At step 508, the perceptual quality calculator 160 receives the source resolution 180, the target source 187, the target encode 185, and the target device type 190. At step 510, the perceptual quality calculator 160 computes the base quality score 365 associated with the target encode 185. The perceptual quality calculator 160 may compute the base quality score 365 in any technically feasible fashion. For example, the perceptual quality calculator 160 could implement the method steps 416-420 of method 400 described in conjunction with FIG. 4.

At step 512, the viewing device adjuster 330 determines whether the target device type 190 is equal to the base device type. If, at step 512, the viewing device adjuster 330 determines that the target device type 190 is not equal to the base device type, then the method 500 proceeds to step 514.

At step 514, the viewing device adjuster 300 sets the absolute viewing score 195 equal to the base quality score 365, and the method 500 terminates.

If, however, at step 512, the viewing device adjuster 330 determines that the target device type 190 is equal to the base device type, then the method 500 proceeds directly to step 516. At step 516, the viewing device adjuster 330 sets the target device equation 340 equal to one of the device equations 175 based on the target device type 190. At step 518, the viewing device adjuster 330 computes the absolute viewing score 195 based on the target device equation 340 and the base quality score 365. Subsequently, any number of the absolute quality scores 195 may be aggregated to generate an aggregate quality score as part of evaluating the visual quality of streamed media content. The method 500 then terminates.

In sum, the disclosed techniques may be used to efficiently and reliably predict an absolute quality score for encodes derived from sources. Initially, a subjective metric subsystem divides sources into assigned source buckets based on the spatial resolutions of the sources. Each assigned source bucket is associated with an assigned source resolution. For each assigned source bucket, the subjective metric subsystem derives encodes from each source and generates an associated objective source bucket that includes an objective value set for each of the encodes.

Subsequently, for each assigned source bucket, a training subsystem trains a corresponding source model based on the associated objective bucket and a corresponding subjective source bucket. For each encode associated with the assigned bucket, the subjective source bucket includes a "base" absolute quality score that is assigned based on human video-viewings of the encode on a base viewing device. The base viewing device is associated with a base device type. In this fashion, each source model is trained to associate an objective value set for an encode associated with a particular source resolution and a base quality score for the encode.

For each additional device type, a conversion subsystem generates a corresponding device equation based on a base subjective bucket and a device subjective bucket associated with the additional device type. For each encode generated by the metric engine, the base subjective bucket includes the base quality score. For each encode generated by the subjective metric subsystem, the device subjective bucket associated with a given additional device type includes the absolute quality score associated with the additional device type. The absolute quality score associated with an additional device type is assigned based on human video-viewings of the encode on an additional viewing device that is associated with the associated additional device type.

To determine the absolute quality score for a target encode, a perceptual quality calculator sets a target model equal to the source model associated with the spatial resolution of the source from which the target encode was derived. The perceptual quality calculator then computes a base quality score associated with the target encode based on the target model and a set of objective metrics for the target encode. If the target device type associated with the viewing device on which the target encode is to be viewed is equal to the base device type, then the perceptual quality calculator sets the absolute quality score associated with the encode equal to the base quality score associated with the encode.

If, however, the target device type does not equal the base device type, then the perceptual quality calculator sets a target device equation equal to the device equation associated with the target device type. The perceptual quality calculator then computes the absolute quality score for the target encode based on the target device equation and the base quality score for the target encode.

Advantageously, the perceptual quality calculator accurately predicts the visual quality of encodes derived from sources having different spatial resolutions as perceived when viewed on different viewing devices. More specifically, training different models based on sources having different spatial resolutions enables the perceptual quality calculator to accurately compute base quality scores for encodes derived from sources having a wide range of spatial resolutions. In a complementary fashion, generating device equations for different viewing devices enables the perceptual quality calculator to accurately adjust base quality scores to reflect the target viewing device. Consequently, the absolute quality scores allow meaningful comparison and effective optimization operations across encodes derived from a wide range of sources and viewed on viewing devices with diverse viewing characteristics.

1. In some embodiments, a method comprises determining a first absolute quality score for first encoded video content viewed on a baseline viewing device; determining that a first value of a first type for a first viewing device is not equal to a base value of the first type for the baseline viewing device; and computing a second absolute quality score for the first encoded video content viewed on the first viewing device based on the first absolute quality score and the first value, wherein the second absolute quality score is aggregated with one or more other absolute quality scores in evaluating the visual quality of streamed media content.

2. The method of clause 1, wherein the first type comprises a device type, and the first value indicates a mobile device, a laptop device, or a television device.

3. The method of clauses 1 or 2, wherein computing the second absolute quality score comprises selecting a first device relationship based on the first value, wherein the first device relationship associates a base absolute quality score for encoded video content viewed on the baseline device and an absolute quality score for the encoded video content viewed on a third viewing device; and mapping the first absolute quality score to the second absolute quality score based on the first device relationship.

4. The method of any of clauses 1-3, wherein the first device relationship comprises a polynomial relating to the first value for the first type.

5. The method of any of clauses 1-4, further comprising generating the first device relationship based on a first set of mean opinion scores associated with the baseline viewing device and a second set of mean opinion scores associated with the third viewing device.

6. The method of any of clauses 1-5, further comprising computing a first mean opinion score included in the first set of mean opinion scores based on a first plurality of human-observed quality scores assigned while viewing re-constructed training video content derived from encoded training video content on the baseline viewing device.

7. The method of any of clauses 1-6, wherein determining the first absolute quality score comprises computing a first set of objective values for a set of quality metrics based on the first encoded video content; and computing the first absolute quality score based on the first set of objective values and a first model.

8. The method of any of clauses 1-7, wherein the first model is included in a plurality of models, and further comprising selecting the first model based on a first spatial resolution of first video content from which the first encoded video content is derived.

9. In some embodiments, a computer-readable storage medium includes instructions that, when executed by a processor, cause the processor to perform the steps of determining a first absolute quality score for first encoded video content viewed on a baseline viewing device; selecting a first device relationship based on a first value of a first type for a first viewing device; and computing a second absolute quality score for the first encoded video content viewed on the first viewing device based on the first absolute quality score and the first device relationship, wherein the second absolute quality score is aggregated with one or more other absolute quality scores in evaluating the visual quality of streamed media content.

10. The computer-readable storage medium of clause 9, wherein the first type comprises a spatial resolution, and the first value indicates 480p, 720p, 1080p, or 4K.

11. The computer-readable storage medium of clauses 9 or 10, wherein the first type comprises a device type, and the first value indicates a mobile device, a laptop device, or a television device.

12. The computer-readable storage medium of any of clauses 10-11, wherein the first device relationship associates a base absolute quality score for encoded video content viewed on the baseline device and an absolute quality score for the encoded video content viewed on a third viewing device, and computing the second absolute quality score comprises mapping the first absolute quality score to the second absolute quality score based on the first device relationship.

13. The computer-readable storage medium of any of clauses 10-12, further comprising generating the first device relationship based on a first set of mean opinion scores associated with the baseline viewing device and a second set of mean opinion scores associated with the third viewing device.

14. The computer-readable storage medium of any of clauses 10-13, further comprising performing one or more curve fitting operations on a plot to generate a second-order polynomial that comprises the first device relationship, wherein the plot includes the first set of mean opinion scores associated with the baseline viewing device and the second set of mean opinion scores associated with the third viewing device.

15. The computer-readable storage medium of any of clauses 10-14, wherein determining the first absolute quality score comprises computing a first set of objective values for a set of quality metrics based on the first encoded video content; and computing the first absolute quality score based on the first set of objective values and a first model.

16. The computer-readable storage medium of any of clauses 10-15, wherein the first model is included in a plurality of models, and further comprising selecting the first model based on a first spatial resolution of first video content from which the first encoded video content is derived.

17. The computer-readable storage medium of any of clauses 10-16, wherein the first model associates a set of objective values for the set of objective quality metrics with an absolute quality score.

18. In some embodiments, a system comprises a memory storing a perceptual quality application; and a processor coupled to the memory, wherein when executed by the processor, the perceptual quality application causes the processor to compute a first absolute quality score for first encoded video content viewed on a baseline viewing device; determine that a first device relationship is applicable to a first viewing device based on a first value of a first type for the first viewing device; compute a second absolute quality score for the first encoded video content viewed on the first viewing device based on the first device relationship and the first absolute quality score, wherein the second absolute quality score is aggregated with one or more other absolute quality scores in evaluating the visual quality of streamed media content.

19. The system of clause 18, wherein the first type comprises a device type, and the first value indicates a mobile device, a laptop device, or a television device.

20. The system of clauses 18 or 19, wherein first device relationship comprises a polynomial, and the perceptual quality application further causes the processor to generate the polynomial based on a first set of mean opinion scores associated with the baseline viewing device and a second set of mean opinion scores associated with a third viewing device.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method, comprising:
receiving, at a first type of viewing device, encoded video content from a server machine;
performing at least one decoding operation on the encoded video content to generate re-constructed video content, wherein the re-constructed video content is associated with an absolute quality score that is calculated based on both the first type of viewing device and a quality of source video content from which the encoded video content is derived; and
displaying at least one frame of the re-constructed video content on the first type of viewing device.

2. The computer-implemented method of claim 1, further comprising computing the absolute quality score based on a base quality score that reflects a base type of viewing device and a first device equation that converts base quality scores associated with the base type of viewing device to absolute quality scores associated with the first type of the first viewing device.

3. The computer-implemented method of claim 1, further comprising computing a baseline quality score associated with a base type viewing device based on a model that is associated with a spatial resolution of the source video content.

4. The computer-implemented method of claim 1, further comprising computing a plurality of absolute quality scores associated with the first type of viewing device based on a device equation associated with the first type of viewing device and a plurality of base quality scores associated with a plurality of encodes and a base type of viewing device.

5. The computer-implemented method of claim 4, further comprising selecting the device equation from a plurality of device equations based on the first type of viewing device.

6. The computer-implemented method of claim 4, wherein the device equation comprises a polynomial that is generated based on a first set of mean opinion scores associated with a base type of viewing device and a second set of mean opinion scores associated with the first type of viewing device.

7. The computer-implemented method of claim 1, wherein the absolute quality score reflects a spatial resolution of the source video content from which the encoded video content is derived.

8. The computer-implemented method of claim 1, wherein the absolute quality score predicts a perceived visual quality of the re-constructed video content when viewed on the first type of viewing device.

9. The computer-implemented method of claim 1, wherein the first type of viewing device comprises a mobile device, a laptop device, or a television device.

10. One or more non-transitory computer-readable media including instructions that, when executed by one or more processors, cause the one or more processors to perform the steps of:
receiving, at a first type of viewing device, encoded video content from a server machine;
performing at least one decoding operation on the encoded video content to generate re-constructed video content, wherein the re-constructed video content is associated with an absolute quality score that is calculated based on both the first type of viewing device and a quality of source video content from which the encoded video content is derived; and
displaying at least one frame of the re-constructed video content on the first type of viewing device.

11. The one or more non-transitory computer-readable media of claim 10, further comprising computing the absolute quality score based on a base quality score that reflects a base type of viewing device and a first device equation that converts base quality scores associated with the base type of viewing device to absolute quality scores associated with the first type of the first viewing device.

12. The one or more non-transitory computer-readable media of claim 10, further comprising computing a baseline quality score associated with a base type viewing device based on a model that is associated with a spatial resolution of the source video content.

13. The one or more non-transitory computer-readable media of claim 10, further comprising computing a plurality of absolute quality scores associated with the first type of viewing device based on a device equation associated with the first type of viewing device and a plurality of base quality scores associated with a plurality of encodes and a base type of viewing device.

14. The one or more non-transitory computer-readable media of claim 13, further comprising selecting the device equation from a plurality of device equations based on the first type of viewing device.

15. The one or more non-transitory computer-readable media of claim 13, wherein the device equation comprises a polynomial that is generated based on a first set of mean opinion scores associated with a base type of viewing device and a second set of mean opinion scores associated with the first type of viewing device.

16. The one or more non-transitory computer-readable media of claim 10, wherein the absolute quality score reflects a spatial resolution of the source video content from which the encoded video content is derived.

17. The one or more non-transitory computer-readable media of claim 10, wherein the absolute quality score predicts a perceived visual quality of the re-constructed video content when viewed on the first type of viewing device.

18. The one or more non-transitory computer-readable media of claim 10, wherein the first type of viewing device comprises a mobile device, a laptop device, or a television device.

19. A system, comprising:
one or more memories storing instructions; and
one or more processors that are coupled to the one or more memories and, when executing the instructions, are configured to perform the steps of:
receiving, at a first type of viewing device, encoded video content from a server machine;
performing at least one decoding operation on the encoded video content to generate re-constructed video content, wherein the re-constructed video content is associated with an absolute quality score that is calculated based on both the first type of viewing device and a quality of source video content from which the encoded video content is derived; and
displaying at least one frame of the re-constructed video content on the first type of viewing device.

20. The system of claim 19, wherein the one or more processors are further configured to compute the absolute quality score based on a base quality score that reflects a base type of viewing device and a first device equation that converts base quality scores associated with the base type of viewing device to absolute quality scores associated with the first type of the first viewing device.

21. The system of claim 19, wherein the one or more processors are further configured to compute a baseline quality score associated with a base type viewing device based on a model that is associated with a spatial resolution of the source video content.

22. The system of claim 19, wherein the one or more processors are further configured to compute a plurality of absolute quality scores associated with the first type of viewing device based on a device equation associated with the first type of viewing device and a plurality of base quality scores associated with a plurality of encodes and a base type of viewing device.

23. The system of claim 22, wherein the one or more processors are further configured to select the device equation from a plurality of device equations based on the first type of viewing device.

24. The system of claim 22, wherein the device equation comprises a polynomial that is generated based on a first set of mean opinion scores associated with a base type of viewing device and a second set of mean opinion scores associated with the first type of viewing device.

25. The system of claim 19, wherein the absolute quality score reflects a spatial resolution of the source video content from which the encoded video content is derived.

26. The system of claim 19, wherein the absolute quality score predicts a perceived visual quality of the re-constructed video content when viewed on the first type of viewing device.

27. The system of claim 19, wherein the first type of viewing device comprises a mobile device, a laptop device, or a television device.

* * * * *